US006997460B2

(12) United States Patent
Brunke

(10) Patent No.: US 6,997,460 B2
(45) Date of Patent: Feb. 14, 2006

(54) PISTON RING FOR PISTON ENGINES

(75) Inventor: Hans-Ulrich Brunke, Ilsfeld-Helfenberg (DE)

(73) Assignee: MAHLE GmbH, Stuttgart (DE)

( * ) Notice: Subject to any disclaimer, the term of this patent is extended or adjusted under 35 U.S.C. 154(b) by 0 days.

(21) Appl. No.: 10/363,960

(22) PCT Filed: Jul. 11, 2001

(86) PCT No.: PCT/DE01/02644

§ 371 (c)(1), (2), (4) Date: Jun. 24, 2003

(87) PCT Pub. No.: WO02/21025

PCT Pub. Date: Mar. 14, 2002

(65) Prior Publication Data

US 2004/0094902 A1 May 20, 2004

(30) Foreign Application Priority Data

Sep. 7, 2000 (DE) ................................ 100 44 241

(51) Int. Cl.
*F16J 9/12* (2006.01)

(52) U.S. Cl. ....................................... 277/460; 277/498

(58) Field of Classification Search ................ 277/459, 277/460, 496–9, 490
See application file for complete search history.

(56) References Cited

U.S. PATENT DOCUMENTS

| | | | | |
|---|---|---|---|---|
| 1,262,632 A | * | 4/1918 | Bryant | 277/490 |
| 1,356,461 A | * | 10/1920 | Mummert | 277/460 |
| 1,393,542 A | | 10/1921 | Herman | |
| 1,475,366 A | * | 11/1923 | Bessinger | 277/490 |
| 1,613,410 A | | 4/1927 | Post | |
| 1,658,440 A | | 2/1928 | Hanigan | |
| 2,234,159 A | * | 3/1941 | Marien | 277/460 |
| 2,591,920 A | | 4/1952 | Colvin | |

FOREIGN PATENT DOCUMENTS

| | | |
|---|---|---|
| CH | 171815 | 12/1934 |
| DE | 381 535 | 3/1921 |
| DE | 3420404 | 3/1985 |
| DE | 35 11 851 | 10/1986 |
| DE | 198 10 309 | 9/1998 |
| DE | 199 39 002 | 8/2000 |

* cited by examiner

*Primary Examiner*—Alison K. Pickard
(74) *Attorney, Agent, or Firm*—Collard & Roe, P.C.

(57) ABSTRACT

The invention relates to a slot piston ring (1) for the pistons of internal combustion engines or compressors, having a peripheral recess (9) (a so-called scraper ring) that extends close to the slot (2) on the external periphery (3) of the piston facing away from the combustion chamber. The aim of the invention is to reduce oil consumption and the amount of leakage gas of such a piston. To this end, the recess is configured to extend from a zone (10) diametrically opposite the slot, starting with a maximum height (12) which gradually decreases to zero (13) in the direction of the slot or close to the slot.

4 Claims, 1 Drawing Sheet

1
2
3
4
5
6
7
8
9
10
11
12
13
14
15

PISTON RING FOR PISTON ENGINES

CROSS REFERENCE TO RELATED APPLICATIONS

Applicant claims priority under 35 U.S.C. §119 of German Application No. 100 44 241.2 filed Sep. 7, 2000. Applicant also claims priority under 35 U.S.C. §365 of PCT/DE01/02644 filed Jul. 11, 2001. The international application under PCT article 21(2) was not published in English.

The invention relates to a slot piston ring for pistons for internal combustion engines or compressors.

Such a piston ring is known from CH-PS 171 815. In connection with the piston ring shown there, provision is made on the side facing away from the combustion chamber on the external peripheral surface (running surface) for a groove-like recess that extends fully around up to close to the site of the slot in order to obtain a rectangular ring gap. Such a recess for a so-called nose ring is produced by milling. Such a piston ring is not readily satisfactory with respect to lubricant consumption and the passage of leakage gas.

Therefore, the problem of the present invention is to find a piston ring that assures a low consumption of oil and only minor passage of leakage gas in the presence of adequate lubrication conditions, and that can be manufactured at favorable cost.

The solution to this problem is obtained with a piston ring having a recess configured to extend from a zone diametrically opposite the slot with a maximum height gradually decreasing to zero up to or near the slot.

Advantageous further developments according to the invention are discussed below.

The invention is described in the following in greater detail with the help of exemplified embodiments shown in the drawing, in which.

Figures 1, 2, 3, 4:
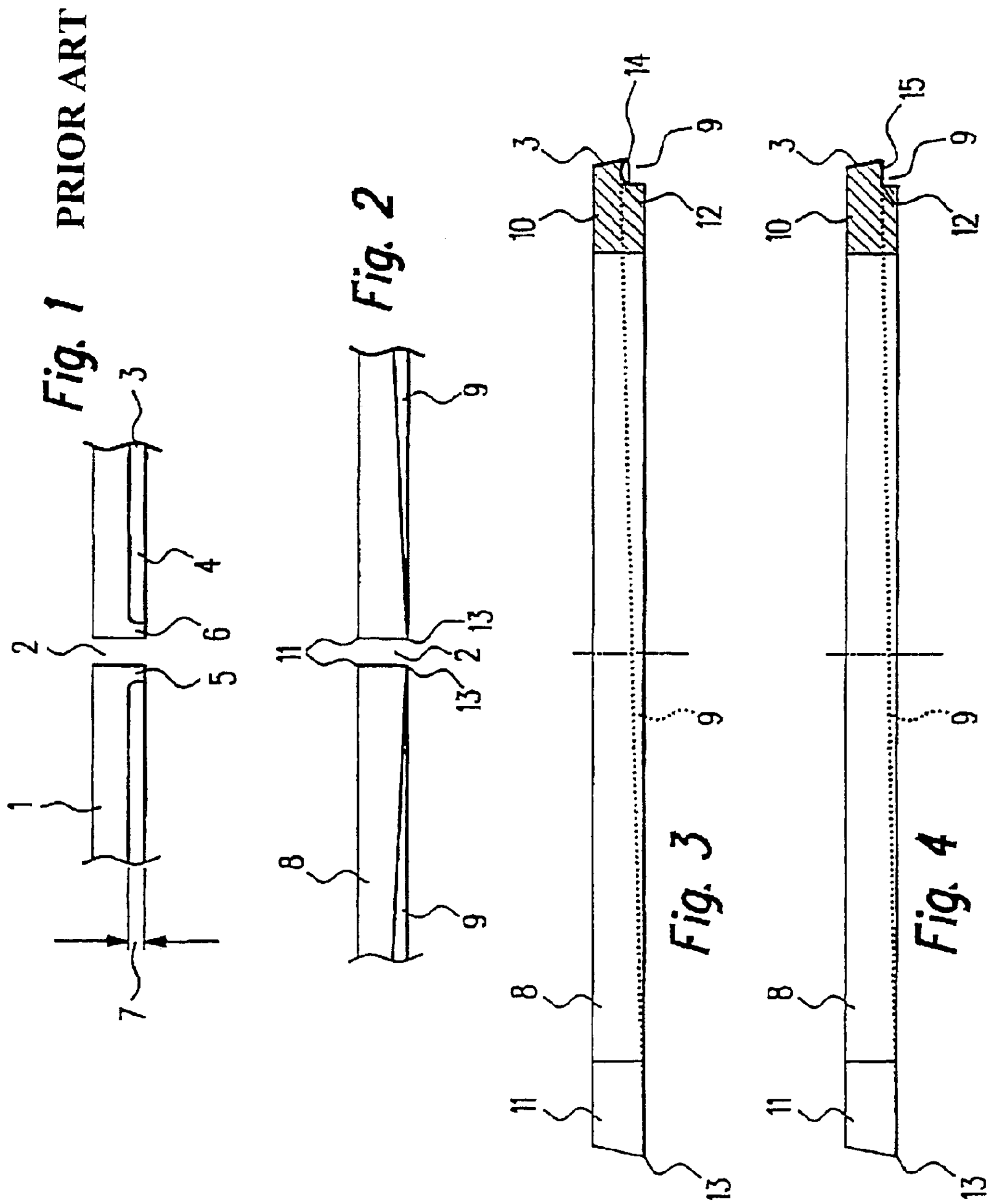
FIG. 1 is a top view of the slot of a piston ring according to the prior art.
FIG. 2 is a top view of the slot of a piston ring as defined by the invention.
FIG. 3 is a side view of a piston ring as defined by the invention, with a sectional representation of the nose-shaped recess.
FIG. 4 is a side view of a piston ring as defined by the invention with a sectional representation of the rectangular recess.

A piston ring 1 with the slot 2 that is simultaneously acting as a compression and oil-stripping ring has a recess 4 on its external side 3 facing away from the combustion chamber. In the prior art, according to FIG. 1, said recess is extending all around like a groove up to the ends 5, 6 of the piston ring near the slot 2 at a uniform height 7.

In connection with a piston ring 8 as defined by the invention according to FIGS. 2 to 4, which is designed in the form of a nose groove ring, a corresponding recess 9 is extending starting from a zone 10 diametrically opposite the slot or gap side 11 at a maximum level 12 up to the slot 2 or gap side 11, gradually decreasing to zero 13. The course of the level of the recess 9 is indicated in the drawing by a dotted line.

Such a recess 9 is produced on the piston ring 8 shown by a simple turning process, in which the piston ring 8 is chucked inclined in its receptacle, so that the corresponding cut is produced in the conventional manner opposite the gap side 11, but decreases to zero diametrically opposite the gap side 11.

The embodiment of the piston ring shown in FIG. 3 is different from the one shown in FIG. 4 in that the recess 9 is realized in one embodiment (FIG. 3) with a rounded shape (nose 14), and in the other embodiment with a rectangular shape 15 (FIG. 4).

Such a nose or grooved nose ring can be employed in connection with pistons for internal combustion engines or compressors in the ring groove one of the piston, on the one hand, and/or in the ring groove two of the piston on the other hand. It has been found in this connection that as compared to conventional embodiments, it was possible to distinctly reduce the oil consumption, on the one hand, and the passage of leakage gas (blow-by) on the other hand, depending on in which location it is used. Therefore, it can be noted that with such a piston ring, it is possible in a manner that is simple both in terms of construction and manufacture to provide a piston ring for the piston of an internal combustion engine or a compressor with which excellent results are achieved with respect to the passage of leakage gas and oil consumption in the presence of adequate lubrication conditions.

What is claimed is:

1. A slot piston ring for pistons for internal combustion engines or compressors, comprising a slot and a recess extending externally on the side facing away from the combustion chamber up to or close to the slot, said recess being part of an outer flanged portion of varying thickness, wherein diametrically opposite the slot, at a point of minimum thickness of the flanged portion, the recess has its maximum height, and wherein up to or near the slot the recess is gradually decreased to zero and the flanged portion has its maximum thickness.

2. The slot piston ring according to claim 1, wherein the recess has a rectangular shape.

3. The slot piston ring according to claim 1, wherein the recess has a rounded shape.

4. The slot piston ring according to claim 1, wherein the recess is mechanically produced by a turning process.

* * * * *